United States Patent
Evans et al.

[15] 3,656,513
[45] Apr. 18, 1972

[54] METHOD OF MANUFACTURING CONTAINER BODIES FROM COMPOSITE STRIP MATERIAL; CONTAINER BODY BLANKS AND CONTAINER BODIES

[72] Inventors: Raymond J. Evans, Hinsdale; George L. Reinhardt, Oaklawn, both of Ill.

[73] Assignee: Continental Can Company, Inc., New York, N.Y.

[22] Filed: Oct. 31, 1966

[21] Appl. No.: 590,658

[52] U.S. Cl. ..........................138/141, 93/80, 93/94 R, 229/45, 156/244
[51] Int. Cl. ...........................................F16l 9/16
[58] Field of Search .................138/141, 140; 161/106, 107; 156/244; 229/4.5; 93/94, 80; 112/130

[56] References Cited

UNITED STATES PATENTS

| | | | |
|---|---|---|---|
| 3,280,709 | 10/1966 | Elam | 229/4.5 X |
| 3,230,127 | 1/1966 | Cleereman et al. | 156/244 |
| 3,245,864 | 4/1966 | Shanok et al. | 156/244 X |
| 3,242,829 | 3/1966 | White | 229/4.5 X |
| 3,307,738 | 3/1967 | Scheindel | 229/4.5 X |
| 3,356,556 | 12/1967 | Violette et al. | 156/244 |
| 3,057,539 | 10/1962 | Leary | 156/244 X |
| 3,138,834 | 6/1964 | Shanok et al. | 156/244 X |
| 2,269,661 | 1/1942 | Gurwick | 93/94 X |
| 3,029,175 | 4/1962 | Stenguist | 93/94 X |
| 2,592,463 | 4/1952 | Phillips | 112/130 X |

FOREIGN PATENTS OR APPLICATIONS

| | | | |
|---|---|---|---|
| 867,764 | 7/1962 | France | 93/94 |

*Primary Examiner*—H. Hampton Hunter
*Attorney*—Walter H. Beland

[57] ABSTRACT

This disclosure relates to a method of manufacturing composite strip material for use in fabricating container bodies by providing a length of strip material having opposite surfaces terminating at parallel side marginal edges, longitudinally severing the strip material to form parallel severed marginal edges, encapsulating the now severed strip material with the thermoplastic material adhering to itself through a space between the severed marginal edges and outboard of the side marginal edges, and longitudinally severing the thermoplastic material in general alignment with said space.

22 Claims, 17 Drawing Figures

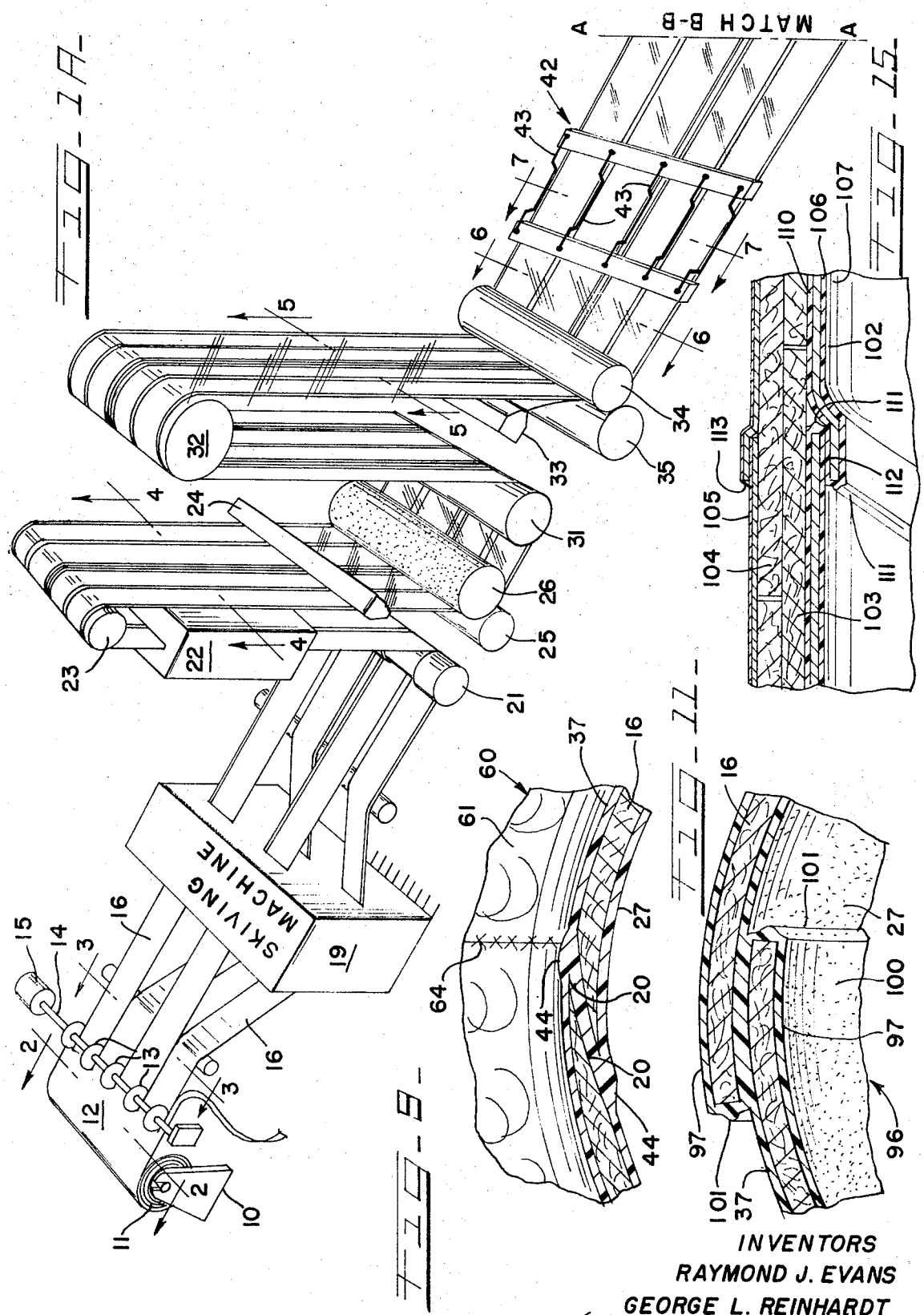

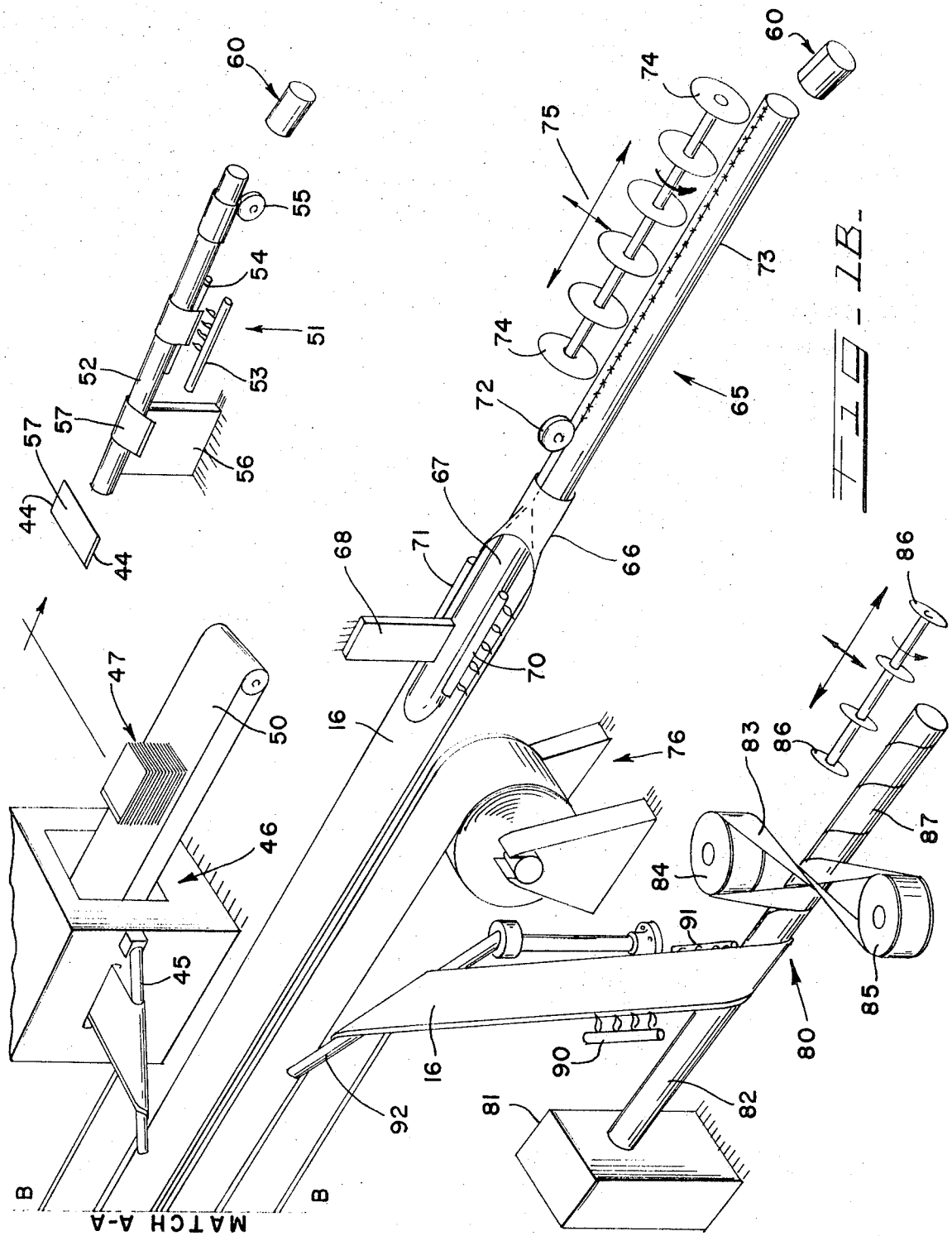

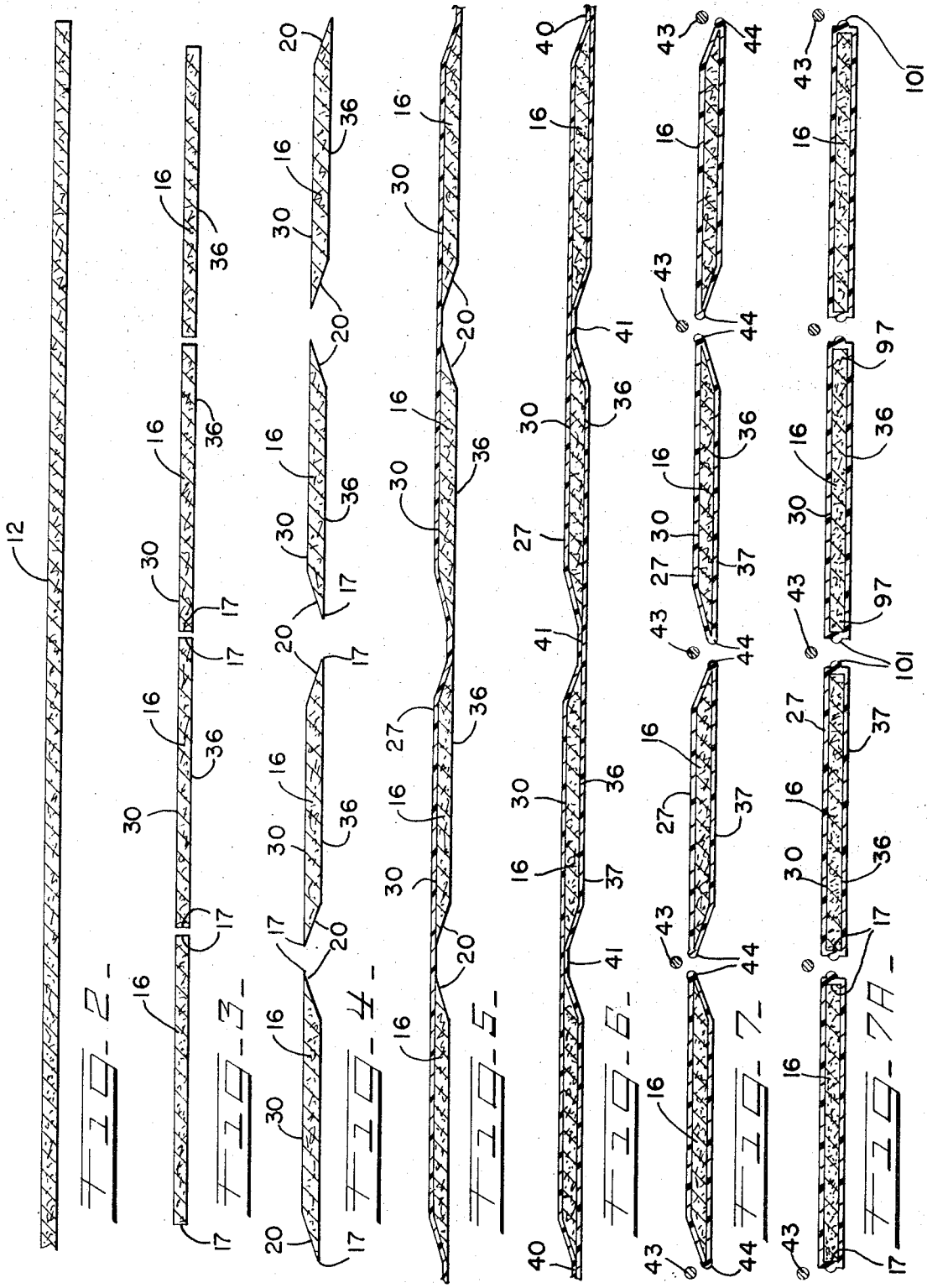

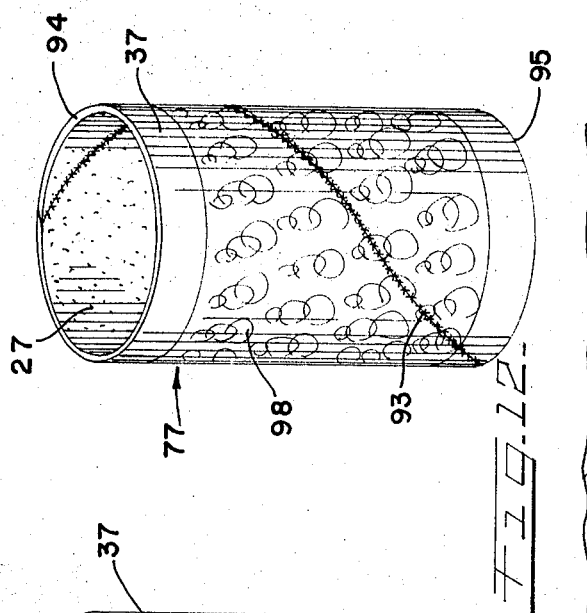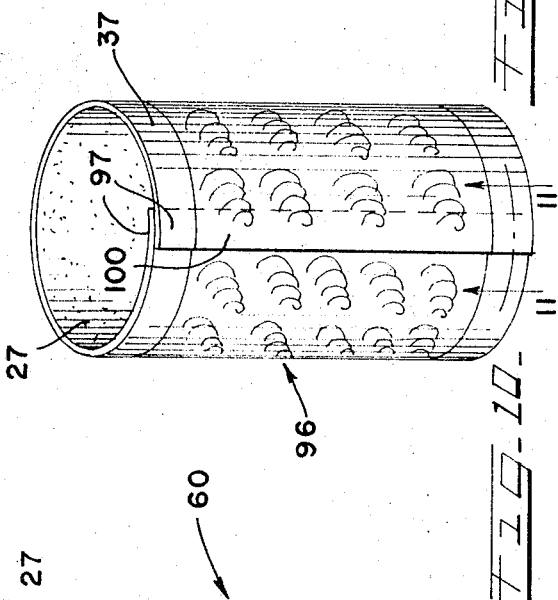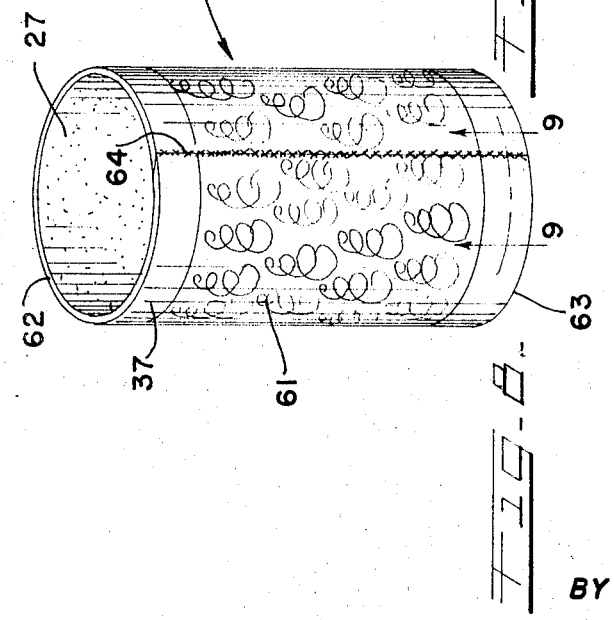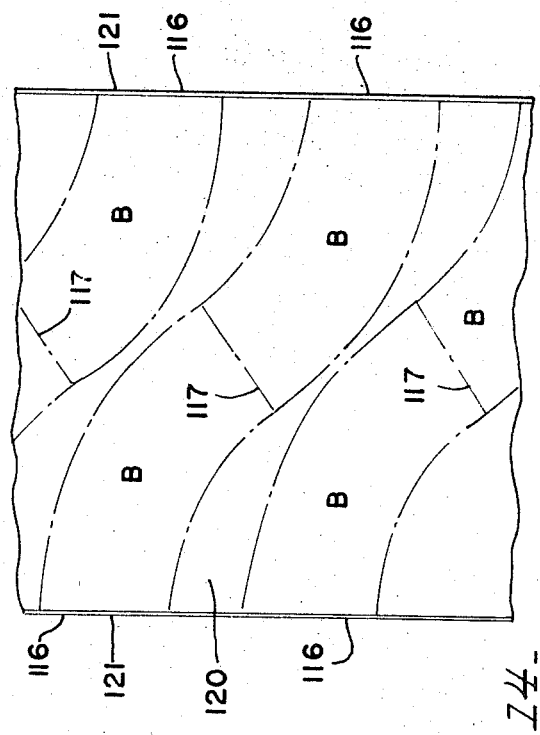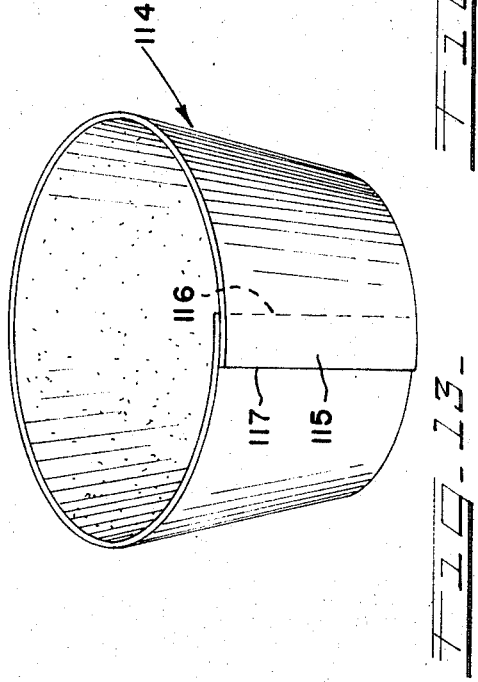

METHOD OF MANUFACTURING CONTAINER BODIES FROM COMPOSITE STRIP MATERIAL; CONTAINER BODY BLANKS AND CONTAINER BODIES

This invention relates to the art of manufacturing paper or paperboard bodied containers such as cans, cups and tubs. There is an increasing trend in the packaging field toward the use of paperboard bodied containers for automobile engine oil and fruit juices. The reason for this trend is that such containers are relatively inexpensive and light in weight when compared with the usual containers constructed entirely of metal. It has been found that when properly constructed such paperboard bodied containers exhibit sufficient strength for the intended purpose as long as the paper is adequately protected from absorbing moisture from the external environment or from the contained product.

In the past it was very common to form paper containers from plain paper and then dip the entire container into a tank of molten wax. The wax coating resulting from this operation effectively protected the paper against moisture penetration. Although the wax dipping technique is still employed in the manufacture of paper drinking cups, paper tubs and milk cartons, the trend is toward making such containers from paper or paperboard blanks precoated with moisture impervious plastic films or metal foils. Paper strip stock precoated on one side with aluminum foil to render it moisture impervious is now very commonly used for liner and decorative plies in the manufacture of automobile engine oil cans and frozen fruit juice cans. Similarly, paper strip stock coated on one or both sides thereof with polyethylene film is being increasingly employed in the manufacture of paper cups, tubs and cartons.

In the manufacture of such paper or paperboard containers two general methods have been employed. In each method the paper or paperboard coated with plastic film or metal foil on one or both surfaces thereof is supplied in rolls of great width and must be slit by means of slitters into a plurality of strips having a width of proper dimension for the formation of the desired size container. In the one method of manufacture, the narrow strips are sheared transversely at equally spaced apart points therealong so as to form rectangular container body blanks. The so formed blanks are then formed around a mandrel with blank portions adjacent opposed marginal edges thereof overlapped and sealed together so as to form the body for a carton or can. In the event that the finished container bodies are to be of frusto-conical configuration, such as employed in paper cups and tubs, the strips of material instead of being transversely cut into rectangular blanks have the necessary curved shaped body blanks cut out therefrom by means of blanking dies. Each cut out curved blank is formed around a tapered mandrel in such manner that opposed marginal edges of the blank are in overlapped relationship. The blank portions adjacent the overlapped marginal edges are then sealed together to form a tapered container body.

In the other generally employed method of manufacturing container bodies from such paper or paperboard strip stock, strip material is progressively helically wound on a winding mandrel so as to form a continuously produced tube having a helical seam. It is the usual practice that the spirally wound tube is made up of a plurality of layers of spirally wound strip material in order to achieve the desired strength and impermeability. The first wound strip is usually of very light paperstock coated only on one side with metal foil or plastic film and is known as the liner ply. At least one and more often two strips of paperboard are helically wound around the liner ply so as to form what are called structural plies. The structural plies are adhered to one another and to the paper backing of the liner ply usually by a separately applied adhesive. A helically wound decorative ply is usually then applied over the outer structural ply and adhered thereto by means of a suitable adhesive. The outer decorative ply is usually of thin paper stock covered on the outer surface only with a decorated metal foil or with a printed on decoration covered with a clear plastic film. The outer decorative ply in most instances has a helical seam of the overlapped type. Also in most instances, the side edges of the heavy gauge structural plies are disposed in abutting relationship. As the tube made up of the various plies advances along the forming mandrel it is cut by means of a flying cutter either into a plurality of container bodies during each cutting operation or into a long stick from which container bodies are subsequently cut.

In both of the above explained methods of manufacturing container bodies from paper or paperboard strip material or combinations thereof there will be a raw paper edge exposed to the container contents and to the surrounding environment unless measures are taken to seal or conceal the exposed paper edges.

One approach that has been used to seal the raw cut edges of surface coated paper container body blanks has been to group the blanks in stacks and then either dip coating or spray coating the edges of the stacked blanks with a suitable protective lacquer. This method is not entirely satisfactory partly due to the roughness of the cut edges being coated and partly due to the high absorbency of the paper which soaks up the coating material like a sponge, resulting in the edges taking on the characteristics of a micro-porous filter being partially permeable to the penetration of moisture to at least a slight depth.

In the manufacture of spirally wound containers such as for automobile engine oil and frozen fruit juices one of the common practices has been to upwardly fold over the trailing edge of the usually employed interiorly disposed metal foil - paper laminate strip and then employing a hot melt adhesive to secure the folded edge in underlapped relationship to the leading unfolded edge of the strip as it is being helically wound on the forming mandrel so that only the folded over protected edge is exposed interiorly of the tube being wound. Although cans made in accordance with this method have gained appreciable commercial acceptance it is desirable to eliminate the necessity of folding over the exposed raw edge which is a relatively costly operation in terms of the material employed in the folded edge.

In accordance with the method of the present invention, the above enumerated objections or difficulties in connection with the prior art methods of manufacture have been eliminated with a resulting advance in the art.

In practicing the present invention, a wide roll of paper or paperboard is positioned on an unwind roll stand. The web of paper or paperboard is first acted upon by a series of slitting knives that trim the uneven side marginal edges thereof and cut the web into a plurality of relatively narrow strips. The side marginal edges of the strips are then tapered down to a fine edge in a skiving machine. After being skived, the strips are laterally evenly spaced apart and the surfaces thereof made receptive to the adhesion of plastic film by subjecting them to corona discharge or by sizing them with a suitable material such as a polyethylene amide. The so treated or coated strips all disposed in a common plane but separated apart slightly now have applied to one planar surface a wide expanse of plastic film that is wider than the combined width of strips so as to provide a fin extending beyond the outer edges of the outermost strips. Although the film may be provided in roll form, it is preferred to directly extrude the film from an extrusion device onto the strip material. In order to effect the bonding of the film to the strips of paper or paperboard the film covered strips are passed between a pair of pressure applying rolls that firmly press the film into tightly adhering contact with the strips. The opposite planar surface of the strips is now similarly covered with a plastic film and the film covered strip assembly passed between pressure rolls so as to tightly adhere the just applied film to the surface of the strips and also to the projecting fins extending beyond the outermost edges of the outermost strips so as to effect the encapsulation of the group of strips between the plastic films. The last applied film is also brought into sealing contact with the first applied expanse of film in the spaces between the laterally spaced apart strips to effect the encapsulation of each individual strip between the first and last applied expanses of plastic film. The sealing of the films together is a heat seal in view of the fact that the last applied film is heated to a semi-molten condition before it is extruded onto the strips or would be heated to such a condition if it were being applied from roll stock. The result is that the portions of the two applied film coatings that extend beyond the outermost strips and between the strips are welded together by means of heat and pressure. The paper or paperboard film and strip assembly is now separated so as to form individual film encapsulated strips by means of hot wires placed closely adjacent the side marginal edges of the strips. Since the plastic films applied are relatively thin, for the sake of economy, the hot wires rapidly melt back the fins of plastic film overhanging the outermost marginal edges of the outermost strips causing them to disappear into the form of a bead as viewed in a transverse cross section, which extends along each marginal edge, so as to create nicely rounded and well protected strip edges. Similarly the plastic fins extending between adjacent strips are severed and melted back by means of the hot wires place equally between adjacent strip edges and slightly away from the path of the joined portions of film extending between adjacent strips so that the film does not actually contact the hot wires. Here also the melting back of the plastic fins results in the provision of a nicely rounded bead of plastic along the inner disposed strip edges. The so formed now separated and encapsulated strips of paper or paperboard may now be wound up on a wind-up stand into roll form for the subsequent manufacture of container bodies. The skiving or tapering of the edges of the strip is in the nature of a refinement that may be dispensed with in many instances of container body manufacture and the finished plastic encapsulated strips may therefore either have or not have tapered side marginal edge portions as desired.

Instead of winding the finished strip stock into roll form as just explained, it is also feasible to cut the strips up into rectangular blanks which would later be delivered in stacks into a container body forming machine. Still other alternatives are to use the strips directly upon manufacture and delivering them to a spiral winding machine for the formation of spirally wound container bodies or to apparatus that progressively forms the strip material into tubular shape such that the marginal edges are in overlapping relationship extending axially along the tube wall and with strip surfaces adjacent the marginal edges being sealed together so as to form an axially extending side seam after which the so formed tube is cut up into individual container body lengths.

Still another method of using the encapsulated strips is to blank out body blanks from the encapsulated material that are not rectangular in shape, such as for frusto-conical shaped containers like paper cups or tubs, in such a manner that the interior side seam forming marginal edge of the blank will be one of the beaded edges of the strip material.

With the above commentary in mind it is therefore a broad object of the invention to provide a new and novel method of encapsulating strip material within two opposed expanses of thin plastic film.

Another broad object of the invention is to provide methods of using the encapsulated strip material in novel ways in the manufacture of container bodies therefrom.

Another broad object of the invention is to provide a new and novel method of manufacturing strip material which is tapered along side marginal edges and encapsulated within an envelope of thin plastic film.

Still another broad object of the invention is to provide new and novel container body constructions which employ strip material encapsulated in accordance with the invention in their manufacture.

Another object of the invention is to provide novel container body blanks and strips made in accordance with the invention.

Still further and more specific advantages and objects of the invention will become apparent upon referring to the following description of the preferred forms of the invention and methods employed as illustrated in the accompanying drawings in which:

FIGS. 1A and 1B when matched along the lines A—A and B—B, respectively thereon, combine to illustrate a preferred form of apparatus employed in practicing the method of encapsulating strip material and also various methods of manufacturing container bodies from the encapsulated strips;

FIG. 2 is a transverse sectional view through the wide web of paper or paperboard roll stock taken along line 2—2 of FIG. 1A just as it leaves the unwind stand;

FIG. 3 is a transverse sectional view similar to FIG. 2 taken along line 3—3 of FIG. 1A showing the web just after it has been slit and trimmed into a plurality of narrow strips;

FIG. 4 is a transverse sectional view taken along line 4—4 of FIG. 1A and shows the plurality of strips after they have passed through the skiving machine to bevel the side edge portions thereof and after being treated for better adhesion and spaced apart;

FIG. 5 is a transverse sectional view taken along line 5—5 of FIG 1A showing the spaced apart and beveled strips upon completion of the application of one expanse of plastic film thereto;

FIG. 6 is a transverse sectional view taken along line 6—6 of FIG. 1A showing the strips after the application of the second expanse of plastic film thereto;

FIG. 7 is a transverse sectional view taken along line 7—7 of FIG. 1A illustrating the hot wires melting back the thin plastic fins that extend outwardly from the outermost strips and between adjacent strips so as to form a rounded bead of plastic along the terminal side edges of the strips;

FIG. 7A is a view similar to that of FIG. 7 showing strip material similarly encapsulated in plastic film but with the exception that the strips have not been skived or bevelled adjacent their side marginal edges;

FIG. 8 is a perspective view of a container body having a longitudinally extending side seam of the scarfed type; the container body having been formed from strip material that has been skived and encapsulated as illustrated in FIG. 7;

FIG. 9 is a slightly tilted and enlarged fragmentary sectional view taken along line 9—9 of FIG. 8 and illustrating the scarfed type side seam construction;

FIG. 10 is a perspective view of a container body having a longitudinally extending overlapped type side seam; the container body having been fabricated from encapsulated strip material such as illustrated in FIG. 7A;

FIG. 11 is an enlarged slightly tilted fragmentary sectional view taken along line 11—11 of FIG. 10 and illustrating the construction of the overlapped type of side seam employed;

FIG. 12 is a perspective view of a container body having a spiral seam of the scarfed type; the container body having been made from skived and encapsulated material such as shown in FIG. 7;

FIG. 13 is a perspective view of a frusto-conical container body such as for a cup or tub; the container body having a longitudinally extending side seam of the overlapped type such as illustrated in FIG. 11;

FIG. 14 is a plan view of a portion of strip material of the type illustrated in FIG. 7A, having outlined thereon in phantom, body blanks of the type employed in the manufacture of frusto-conical container bodies such as illustrated in FIG. 13; and, FIG. 15 is a fragmentary sectional view to an enlarged scale illustrating a longitudinally extending wall portion of a spirally wound container body of the type employing an inner liner ply, a pair of superimposed structural plies, and an outer decorative ply.

With particular reference to FIGS. 1A and 1B it will be observed that an unwind stand 10 is provided for mounting a large roll of paper or paperboard stock of a relatively great width; the roll being indicated by the numeral 11. A wide web of paper indicated at 12 is unwound from the roll 11 and fed in a generally horizontal direction into a plurality of slitting knives 13 mounted on a shaft 14 for rotation by a motor 15. The slitting knives 13 are usually equally spaced apart on the shaft 14 and effective to trim the side marginal edges of the web 12 and slit and web into a number of strips of even width; the strips being designated by the numeral 16 and best illustrated in FIG. 3. The strips 16 have parallel marginal side edges 17. Alternate strips 16 are directed in diverging paths into a conventional skiving machine 19 in which opposite upper and lower surface portions adjacent the marginal edges 17 thereof are skived or bevelled as best illustrated in FIG. 4 with the skived edge portions being indicated by the numeral 20. As the strips 16 leave the skiving machine, alternate strips are directed along converging paths until the strips are again disposed in a common plane. A roll 21 is employed to direct the strips from the generally horizontal path to a generally vertical path and is also grooved out for the reception of each individual strip in a groove for the purpose of spacing the strips laterally apart a desired amount.

As the spaced apart and skived strips advance upwardly they pass into a conventional treating or sizing apparatus 22 that treats the surfaces thereof in a conventional manner such as by means of corona discharge or by sizing with a polyethylene amide or other suitable sizing material to make the surfaces thereof more receptive to the adhesion of plastic film material to be subsequently applied thereto. Upon passing through the treating or sizing apparatus the treated strips 16 pass around a roll 23 and are directed in a substantially downward direction past a plastic film extruder 24 that directs a hot extruded expanse of thermoplastic film material such as polyethylene onto one planar surface of the strips. In order to achieve the application of a thin film for the sake of economy, the extruded film is allowed to be drawn out thin before the film and strip material pass between the pressure rolls 25 and 26. The pressure roll 26 is made of steel while the pressure roll 25 is preferably surfaced with a resilient material such as rubber. The temperature of the rolls 25 and 26 is preferably controlled in a well known manner by means of heat transfer fluid circulated therein at the desired level below the temperature of the extruded film so as to effect the cooling of the film as it passes between the rolls. In the event that the strips 16 are made of heavy paperboard it is desirable that the rolls 25 and 26 be contoured into conformance with the bevelled edge portions of the strip so that the plastic film indicated by numeral 27 in FIG. 5 will be tightly pressed into adhering contact with the bevelled edge portions as well as with the upper planar strip surfaces indicated at 30. In order that the just applied plastic film 27 will slide easily along forming mandrels and from stacks it is desirable that it be given a mat finish which improves the slip characteristics thereof. This may be accomplished by providing a sandblasted surface finish on the roll 26.

The strip-plastic film assembly now passes around a direction changing roll 31 and is directed substantially vertically upwardly to an upper direction changing roll 32. Upon passing around the roll 32 the assembly is directed substantially vertically downwardly past a second plastic film extruder 33 which with cooperation of pressure rolls 34 and 35 similar to the rolls 25 and 26 effects the application of a second expanse of plastic film to an under planar surface 36 of the strips 16 as well as to appropriate bevelled edges 20. The just applied expanse of plastic film is indicated by the numeral 37 in FIG. 6. Since the plastic film 37 is not required to slide along a mandrel during the formation of container bodies and since it may be used as protection for an outer decorated container surface, the roll 35 will usually be finished very smooth so that the outer surface of the film 37 will be very smooth and glossy. The temperature of the rolls 34 and 35 is likewise controlled at a desired level below the temperature of the extruded plastic film 37.

As best seen in FIG. 6, the expanses of plastic films 27 and 37 extend beyond the outermost edges of the outermost strip 16 and when by heat and pressure welded together by passage through the rolls 34 and 35 result in the formation of welded side fins 40. Likewise intermediate welded plastic fins 41 are formed between adjacently disposed bevelled edges 20.

As the plastic film and strip assembly moves along it is directed past a hot wire film severing and melting back assembly indicated generally by the numeral 42. The assembly 42 includes a plurality of hot wires 43 that are electrically heated in a well known manner. The hot wires are positioned adjacent the side fins 40 and the intermediate fins 41 as shown in FIG. 7. The hot wires 43 are effective to rapidly heat the fins causing the fins 40 to melt back into the form of longitudinally extending rounded beads 44. The intermediate fins 41 are caused to become semi-molten by the hot wires 43 adjacent thereto so that they sever down the center and the severed halves melt back to also form longitudinally extending rounded beads 44. The beads 44 are heavier and stronger than the plastic film material 27 and 37 connecting herewith and form a good protection against damage while at the same time rendering moisture impervious the now sharp side marginal edges 17 of the strip 16.

The so encapsulated strips 16 may be employed in a number of ways in the manufacture of container bodies. As an example, the furthermost strip as viewed in FIG. 1B is delivered around a turning bar 45 into a shearing machine generally indicated at 46 in which the strip material is sheared into rectangular blanks which are delivered in stacks generally indicated at 47 on a take-away conveyor 50.

The stack of blanks 47 is delivered to a container body forming apparatus generally indicated at 51 which includes a forming mandrel 52; marginal edge heating means 53 and 54 in the form of gas burners and a sealing roll 55. The mandrel 52 is suitably supported on a vertical standard 56 in a usual manner.

In the operation of the apparatus 51 blanks from the stack 47 designated by the numeral 57 are delivered onto the mandrel 52 by means of feed dogs on a chain conveyor or other suitable blank forwarding means (not shown) and are progressively formed around the mandrel by suitable forming means (not shown). The partially formed blanks are delivered past the side edge heating means 53 and 54 whereby the plastic material overlying the bevelled edge portions 20 and the beads 44 along the marginal blank edges are heated into a semi-molten condition prior to completing the forming of the blank all the way around the mandrel 52. During the completion of the bending of the blank around the mandrel 52, the bevelled edge portions 20 at opposite ends of the blank are brought into overlapping engagement and are sealed together by means of the sealing roll 55 to form a completed container body generally indicated at 60.

Container body 60 is best shown in FIG. 8. The mat finished plastic film 27 forms the interior moisture impervious lining for the container body 60 while the plastic film 37 forms a moisture impervious exterior ply. When making container bodies such as the container body 60, it is the usual practice to predecorate the web 12 of paper or paperboard so that the planar strip surfaces 36 that form the exterior container side wall surfaces will have the desired decoration appearing thereon as illustrated by the numeral 61. If decoration is employed, it is desirable that the thermoplastic film material which may be polyethylene or other suitable thermoplastic be as smooth and transparent as possible so that the decoration may show clearly through the film. Container body 60 has upper and lower end forming edges 62 and 63 that are formed by the shearing operation in the shearing machine 46, and, as a result, are not moisture impervious. The container body 60, however, is intended to be employed as a can body having metal ends double seamed onto the end forming edges 62 and 63. In such a double seaming operation the metal can ends are provided with a suitable elastomeric type sealing compound in the peripheral channel thereof before being double seamed onto the can body. This elastomeric sealing compound is effective to seal the raw edges of the container body ends 62 and 63 within the double seam so that these edges do not present any sealing problem.

Referring to FIG. 9 it will be seen how the bevelled side marginal edge portions 20 of the body blanks 57 encased in the plastic films 27 and 37 are overlapped and welded together so as to form an axially extending welded container side seam indicated by the weld line 64. As will be seen, the rather sharply defined plastic beads 44 extending along the side seam forming edges of the body blank 57 will be smoothed down during the welding operation to provide additional plastic welding material for a stronger and tighter connection. The just described container body 60 and method of making the same are believed to be patentably novel over the present state of the art in that in accordance with the method, the container body is easily and cheaply fabricated and as a result of the novel side seam formation resulting from the encapsulation of the strip material 16 after the skiving operation any chance of moisture penetrating into the paper or paperboard stock in the area of the side seam is greatly reduced.

The skived edge body blank 57 having the planar surfaces thereof and skived or tapered side seam forming edges encapsulated in plastic film is also believed to be patentably novel and it is intended that this structure be considered as part of the overall invention.

It is also possible to form the container body 60 directly from the encapsulated paper or paperboard strip material 16 instead of from blanks cut therefrom. This is accomplished by passing one of the encapsulated strips 16 through a container body making apparatus indicated generally at 65 in FIG. 1B. The apparatus 65 includes a tube forming device 66 for forming the strip material around a mandrel 67 after the side edge portions thereof have been properly heated by means of heating means 70 and 71 in the form of gas burners. The mandrel 67 is mounted on a depending support 68. After the strip material has been formed by passing through the forming device 66 the bevelled edge portions 20 will be in overlapped relationship and will pass under a pressure sealing roll 72 to effect the formation of an axially extending welded side seam of a continuous tube 73 being produced by the apparatus 65. Tube 73 may be cut into a plurality of long sticks by means of a single flying cutter from which container bodies will subsequently be cut or can be cut directly into container body length by means of the flying cutter blades 74 which cyclically move in a box pattern as indicated by the directional arrows 75 to cut the tube 73 into individual container bodies 60.

As an alternative to directly manufacturing container bodies or body blanks from the encapsulated strip material 16, the strip material may be wound on a wind up stand 76 as it is produced to be stored for future use or to be shipped to remotely located manufacturing machinery of the type just described or a type which will now be described.

Encapsulated strip material 16 may be employed for manufacturing spirally wound container bodies such as, for example, the container body 77 of FIG. 12. Apparatus for making such spirally wound containers is depicted in FIG. 1B and generally indicated by the numeral 80. Apparatus 80 includes a mandrel supporting standard 81 which supports a generally horizontally extending forming mandrel 82 upon which the encapsulated strip material 16 is progressively spirally wound by means of the pressure applying and winding belt 83 entrained around a pair of rotating pulleys 84 and 85 in a manner well known to the art. Apparatus 80 includes either a single flying cutter or a plurality of flying cutters 86 operative to separate the tube being formed indicated at 87 into either long lengths or container body lengths in a manner similar to the operation of the flying cutters of the apparatus 65. Heating means 90 and 91 which are indicated as being in the form of gas burners are employed to heat and soften the plastic film covering the tapered strip marginal edge portions 20 as well as longitudinally extending beads 44 encompassing the terminal sharp edges 17 of the strips so as to bring the plastic into a semi-molten condition. A turning bar 92 is employed to direct the encapsulated strip 16 past the heating means 90 and 91 and directly thereafter onto the forming mandrel 82.

The container 77 made on the spiral winding apparatus 80 has a weld line 93 of the welded side seam thereof that extends spirally around the container body as illustrated in FIG. 12. A transverse sectional view taken in a direction perpendicular through the line of weld 93 would have substantially the same appearance as the seam construction as illustrated in FIG. 9. Container body 77 will also usually be decorated as indicated at 98 and have exposed cut ends indicated at 94 and 95 in a manner similar to the container body 60. Container body 77 is intended to also have metal ends double seamed thereto so as to form a composite type container for such products as automobile engine oil and citrus fruit juices. The method of making the container body 77 as well as the container itself are likewise believed to represent a patentable advance in the art.

A variation in the manner of making encapsulated strips of paper or paperboard is illustrated in FIG. 7A in which method the skiving along the side edges is omitted, with the other steps in the process remaining as heretofore described. In FIG. 10 is illustrated a container body generally designated by the numeral 96 made from encapsulated strip material with unskived side marginal edge portions as depicted in FIG. 7A. In the formation of the container body 96, full thickness side marginal edge portions indicated at 97 are disposed in overlapping relationship and are welded together in container body forming apparatus such as the apparatus 51 or 65. The welding together of the overlapped side marginal edge portions 97 forms a longitudinally extending container side wall seam indicated at 100. The encapsulated strips as indicated in FIG. 7A also have protective beads formed along the extreme side marginal edges 17 thereof similar to the beads 44 of FIG. 7 and indicated by the numeral 101. It is also feasible to employ the encapsulated strip material of FIG. 7A in the manufacture of container bodies of the spirally wound type and the strip material of FIG. 7A as well as convolutely wound container bodies formed therefrom such as illustrated in FIG. 10 and spirally wound containers such as illustrated in FIG. 12 are also believed to represent a patentable advancement in the art.

In FIG. 15 is illustrated a fragmentary portion of a spirally wound container body taken longitudinally through a side wall portion thereof. The illustrated container body portion is made up of a number of separately wound layers including a composite liner ply 102; a first structural ply 103; a second structural ply 104 and a composite outer label or decorative ply 105. The inner liner ply 102 is prepared in accordance with the method of the invention like the encapsulated strips of FIG. 7A. Since the inner liner ply is backed up with heavy weight structural plys the paper stock employed in making the inner liner ply can be very thin and it is therefore not necessary or desirable to skive the edges thereof. The thin paper core of the liner ply is indicated by the numeral 106. The surface of the paper core facing the interior of the container is covered with a thin sheet of plastic film preferably with a mat finish indicated at 107 while the opposite surface is covered with a sheet of plastic film 110. The plastic film material 107 and 110 is welded together in accordance with the invention to provide the thickened plastic bead formation 111 along the terminal side edges of the thin paper core 106. The liner ply 102 is wound in a spiral winding apparatus like the apparatus 80 with side marginal edge portions thereof being heated by means of the gas heaters 90 and 91 and overlapped and welded together as the wound tube progresses through the winding belt 83. The structural plies and outer decorative ply are wound from strip material in sequence over the liner ply and may be adhered together and to the liner ply by means of suitable adhesives; it being understood that when such multi-ply container bodies are being manufactured the winding mandrel 82 must be longer to accommodate the feeding of the multiple strips of material necessary. Although the usual practice is to run the structural plies through the winding belt 83, the outer decorative ply is usually wound on the tube being formed downstream of the winding belt. It will be apparent that a container body constructed in accordance with the FIG. 15 showing will have very good integrity against leakage due to the provision of double plastic film barriers totally encasing the liner ply paper core and due to the cut raw side seam edges of the paper core being well protected by the melted back beads 111 of increased thickness as compared with the thickness of the plastic films 107 and 110. Since the overlapping side marginal edge portions of the spirally wound liner ply seam are securely heat welded together along the spiral side seam as indicated at 112, there is very little possibility of any leakage developing in this area. The outer decorative ply 105 is made up of a decorative metal foil adhered to a thin paper backing with a raw edge of paper being exposed as indicated at 113 to the surrounding environment. When such a container is subjected to severe external moisture conditions such as, for example, as a frozen fruit juice container, too much moisture will leak in through the exposed raw edge of paper 113. Therefore, for such containers it is desirable to also employ a substantially moisture impervious outer decorative ply made in accordance with the invention similar to the liner ply 102.

In addition to the manufacture of cylindrically shaped container bodies, the invention also contemplates the manufacture of non-cylindrically shaped container bodies such as, for example, container bodies of frusto-conical configuration as depicted in FIG. 13. Such frusto-conical container bodies are employed in the manufacture of paper cups and tubs. The container body illustrated in FIG. 13 is generally designated by the numeral 114 and has a longitudinally extending side seam 115 formed by overlapping terminal body blanks edges 116 and 117 and welding the overlapped body blank portions together. Container body blanks for the container bodies 114 as outlined in phantom in FIG. 14 and indicated at B are blanked out from strip material 120 similar to the strips shown in FIG. 7A. The side marginal edges 116 of the strip 120 are protected by means of longitudinally extending beads of plastic similar to the beads 101 of FIG. 7A; the beads being indicated by the numeral 121. The blanks B are blanked out from the strip 120 by means of cutting knives along the phantom outlines so that a portion of the beaded edges 116 forms the inner edge of the side seam 115. The blank edge 117 that appears on the outside of the container body 114 along the side seam 115 will be cut along the phantom line 117 of FIG. 14 so as to present a raw edge of paper along the exterior of the side seam 115. Such an exposed raw edge is often permissible on the exterior side of the container if the container is not subject to severe exterior moisture conditions. By laying out the blanks B as illustrated in FIG. 14 such that the cut lines 117 are common to adjacently disposed blanks, the blanks B are manufactured expeditiously and with a minimum of waste.

Although several container bodies made in accordance with the invention have been described and illustrated, various modifications will become apparent to one skilled in the art upon reading the foregoing specification. As an example, with respect to the container body of FIG. 10, if it is not necessary to have the exteriorly disposed edge of the side wall seam 100 of moisture proof construction, the blanks therefor can be cut out from a double width encapsulated strip such as the strip 120. In order to prepare the desired blanks the double width encapsulated strip material would be cut straight across in a direction normal to the side edges thereof at intervals corresponding to the height of the container body 96. The long blanks so cut out will be twice the necessary length and the final blanks are obtained by cutting the long blanks in half transversely so that the side seam edge that will be disposed exteriorly along the container side wall will be the last mentioned cut edge.

Although the invention primarily relates to manufacturing paper or paperboard container bodies, there are advantages to be obtained in practicing the invention when the base strip material is made from other materials such as, for example, steel. The encapsulating plastic film envelope in such case protects the steel from rusting. It also prevents the interior container wall of a container body made from such strip material from reacting with the product and protects any exterior decoration applied thereto. The plastic film also in such case may be welded together during the joining of a lap type side-seam so as to eliminate the usual soldering of the side seam.

Another variation that may be resorted to is that in bevelling or skiving the edge portions of the strip 16, both edge portions may be bevelled along the upper planar surface toward the marginal edges with the lower planar surface being unbevelled resulting in a transverse strip cross section in the form of a trapezoid rather than in the form of a parallelogram as illustrated in the drawings. This variation is possible because of the softness and flexibility of the paper or paperboard which will permit the formation of a scarfed type container body wall seam from strip material so skived.

Still another variation that may be employed is to use knives to sever the fins 41 extending between the strips 16. In such case the protective beads 44 will not be formed until the strip or blank edges are heated by the burners 53–54; 70–71; or 90–91.

Since still other variations and modifications in container body construction and the method of making container bodies will become apparent to one skilled in the art within the scope of the invention it is therefore not the intent that the scope of the invention be limited to the illustrated embodiments but rather only as set forth in the following claims.

We claim:

1. A method of manufacturing composite strip material for use in fabricating container bodies comprising the steps of: providing a length of strip material having opposed planar surfaces terminating at parallel side marginal edges; covering one of the opposed planar surfaces with an expanse of thermoplastic film that extends outwardly beyond the side marginal edges; covering the other planar surface in a similar manner; welding together the portions of the films that extend outwardly beyond the side marginal edges to encapsulate the strip material in plastic film around its entire transverse periphery and along its length and melting back the welded portions of the films into the form of a protective bead of plastic extending along the side marginal edges.

2. A method of manufacturing container body blanks which includes the steps of preparing composite strip material as set forth in claim 1 further characterized by the step of transversely severing the finished strip material at spaced apart places along its length so as to form individual container body blanks from the severed strip portions.

3. A method of manufacturing container body blanks which includes the steps of preparing composite strip material as set forth in claim 1 further characterized by the steps of transversely severing the finished strip material at spaced apart places along its length so as to form a plurality of oversize blanks from the severed strip portions and then severing the oversize blanks transversely with respect to the severed edges to provide blanks of proper dimension for forming into container bodies with one marginal blank edge being sealed and protected with a bead of plastic.

4. A method of manufacturing body blanks for non-cylindrical container bodies which includes the steps of preparing composite strip material as set forth in claim 1 further characterized by the step of cutting the blanks from the strip material in such a manner that one container side seam forming edge of said blank includes a portion of said side marginal strip edge having said bead of plastic.

5. A method of sealing and protecting a marginal edge of sheet material used in making container bodies comprising: providing an expanse of the sheet material having opposed parallel planar sheet surfaces and a marginal edge that requires sealing and protecting; covering one planar surface with a first thin film of thermoplastic material that extends beyond the said sheet edge; covering the other planar surface with a second thin film of thermoplastic material that also extends beyond the said sheet edge; heat sealing the portions of film together that extend beyond the said edge to form a fin of thermoplastic material extending outwardly from the said edge and then melting back the fin into the form of an enlarged rounded bead that extends along the said edge to seal and protect the said edge.

6. A method of manufacturing composite strip material for use in fabricating container bodies comprising the steps of:

providing a plurality of strips having opposed parallel planar surfaces and parallel side marginal edges; assembling the strips in a common plane with adjacent side marginal edges of adjacent strips being spaced apart and parallel to each other; adhering a first expanse of plastic film of sufficient width to extend beyond the outermost side marginal edges of the strip assembly to one planar surface of the strips; adhering a second expanse of plastic film in a similar manner to the other planar surface of the strips and to the first expanse of film where it bridges the space between strips and where it extends beyond the outermost side marginal edges of the strip assembly to encapsulate the individual strips around their transverse perimeters and along their length in an envelope of plastic film; severing the joined expanses of plastic films extending between adjacent strips; melting back the severed portions of joined films extending from the adjacent strip edges into the form of protective plastic beads extending along the adjacent strip side marginal edges and similarly melting back the joined film portions that extend beyond the outermost side marginal edges of the strip assembly into the form of similar protective beads extending along the said outermost side marginal edges.

7. A method of manufacturing composite material for use in fabricating container bodies as set forth in claim 6 including the additional step of bevelling the strips adjacent to and along the side marginal edges so as to thin down the side marginal edges prior to the step of adhering the said expanses of plastic films to the strips.

8. Composite strip material for use in making container bodies comprising: a core strip having opposed parallel planar surfaces and parallel side marginal edges; an expanse of film covering each of the opposed parallel planar surfaces with the expanses of film passing around one marginal edge and blending together into a fused enlarged edge sealing and protecting bead extending along the said one marginal edge.

9. Composite strip material for use in making container bodies as set forth in claim 8 further characterized in that the other of said side marginal edges is similarly provided with a protecting bead.

10. A container body blank comprising: an expanse of core material having opposed parallel planar surfaces and two side seam forming marginal edges; an expanse of thermoplastic film covering each of the opposed parallel planar surfaces with the expanses of film covering each of the opposed parallel planar surfaces with the expanses of film passing around one side seam forming marginal edge and blending together into a fused enlarged edge sealing and protecting bead extending along the said one side seam forming edge.

11. A container body blank as set forth in claim 10 further characterized in that the other of said side seam forming edges is similarly provided with a protecting bead.

12. A method of manufacturing composite strip material for use in fabricating container bodies comprising the steps of providing a length of strip material having opposite surfaces terminating at parallel side marginal edges, longitudinally severing the strip material to form parallel severed marginal edges, encapsulating the now severed strip material with thermoplastic material with the thermoplastic material adhering to itself through a space between the severed marginal edges and outboard of the side marginal edges, and longitudinally severing the thermoplastic material in general alignment with said space.

13. The method as defined in claim 12 including the step of skiving at least said severed marginal edges prior to the encapsulation thereof by the thermoplastic material.

14. The method as defined in claim 12 including the step of melting back the thermoplastic material into the form of a protective bead extending along said side marginal edges and outboard thereof.

15. The method as defined in claim 12 including the step of melting back the thermoplastic material into the form of a protective bead extending along said severed marginal edges and outboard thereof.

16. The method as defined in claim 13 including the step of melting back the thermoplastic material into the form of a protective bead extending along said side marginal edges and outboard thereof.

17. The method as defined in claim 13 including the step of melting back the thermoplastic material into the form of a protective bead extending along said severed marginal edges and outboard thereof.

18. The method as defined in claim 14 including the step of melting back the thermoplastic material into the form of a protective bead extending along said severed marginal edges and outboard thereof.

19. Composite strip material for use in making container bodies comprising a core strip having opposed parallel planar surfaces and parallel side marginal edges; said core strip having a bevelled surface adjacent to and along each side marginal edge to provide sharp side marginal edges; said planar surfaces, said bevelled surfaces and said sharp marginal edges being encapsulated in an envelope of thin thermoplastic film, wherein the envelope of thermoplastic film includes a thickened protective bead portion of rounded configuration extending along each sharp edge to protect the sharp edges and ensure that the sharp edges are moisture impervious.

20. A container body blank comprising an expanse of core material having opposed parallel planar surfaces; parallel container side seam forming marginal edges and parallel container body end forming marginal edges disposed normally to the side seam forming edges; said core material having a bevelled surface adjacent to and along each side seam forming marginal edge to provide sharp side seam forming marginal edges; said planar surfaces, said bevelled surfaces and said sharp marginal edges being encapsulated in an envelope of thin thermoplastic film in which the envelope of thermoplastic film includes a thickened protective portion of rounded configuration extending along each sharp edge to protect the sharp edges and ensure that the sharp edges are moisture impervious.

21. A method of manufacturing container bodies of the multiply type including a thin inner liner ply and at least one ply overlying the liner ply comprising the steps of providing a length of liner ply strip material having opposed parallel planar surfaces and side marginal edges; encapsulating the strip around its entire transverse perimeter and along its length in an envelope of thermoplastic film; heating mating surface portions of the opposite side marginal edges to melt the thermoplastic film thereon; progressively forming the encapsulated strip around a mandrel into a tubular shape with the mating surface portions of the opposite side marginal edges in overlapping relationship; pressing the overlapped mating surface portions together to form a welded tube wall seam; covering the formed liner ply tube with the said at least one ply overlying the liner ply to form a multiply tube and subsequently cutting the multiply tube into a plurality of container bodies, further characterized in that the step of encapsulating the strip in an envelope of thermoplastic film comprises the steps of covering one of the opposed planar surfaces of the liner ply strip material with an expanse of thermoplastic film that extends outwardly beyond the side marginal edges; covering the other planar surface in a similar manner; welding together the portions of the films that extend outwardly beyond the side marginal edges and melting back the welded portions of the films into the form of a protective bead of plastic extending along the side marginal edges.

22. A method of manufacturing composite strip material for use in fabricating container bodies comprising the steps of providing a length of strip material having opposite surfaces terminating at parallel side marginal edges, encapsulating the strip material with thermoplastic material, transversely and longitudinally severing the strip material to form transversely adjacent container body blanks each of which includes an encapsulated side margin and a severed side margin, and forming each container body blank into a container body having a seam defined by the severed side margin exteriorly of and secured to the interior encapsulated side margin.

* * * * *